United States Patent [19]

Umeda et al.

[11] 3,989,305
[45] Nov. 2, 1976

[54] TIRE RIM AND BRAKE DRUM ARRANGEMENT

[75] Inventors: Haruhiko Umeda, Yokohama; Katsuyoshi Mori, Tokyo; Hiroyuki Sasaki; Seiichi Hishinuma, both of Kawasaki, all of Japan

[73] Assignee: Kabushiki Kaisha Komatsu Seisakusho, Tokyo, Japan

[22] Filed: Dec. 13, 1974

[21] Appl. No.: 532,396

[30] Foreign Application Priority Data
Dec. 14, 1973 Japan............... 48-141931

[52] U.S. Cl................ 301/6 S; 188/218 R
[51] Int. Cl.²......................... B60B 23/00
[58] Field of Search............. 188/17, 18 R, 218 R; 301/6 R, 6 S, 6 W

[56] References Cited
UNITED STATES PATENTS

| | | | |
|---|---|---|---|
| 1,439,424 | 12/1922 | Knudsen | 301/6 W |
| 1,544,297 | 6/1925 | Einfeldt | 301/6 S |
| 1,896,821 | 2/1933 | Keller | 301/6 W |
| 2,544,387 | 3/1951 | Kerr | 301/6 W |
| 2,849,087 | 8/1958 | Schjolin et al. | 188/18 R |
| 3,334,946 | 8/1967 | Strobel | 301/6 R |

*Primary Examiner*—Trygve M. Blix
*Assistant Examiner*—Edward R. Kazenske
*Attorney, Agent, or Firm*—Armstrong, Nikaido & Wegner

[57] ABSTRACT

A brake drum arrangement for use in a braking system wherein a wheel brake is disposed outside a tire, comprises a brake drum having inner end face thereof fixedly secured to the outer end face of a wheel hub, the outer peripheral surface of the brake drum being flush with that of the wheel hub, an annular rim stopper adapted to be mounted on the outer peripheral surface of the brake drum, and a plurality of wheel clamps adapted to be fixedly secured to the outer side face of the brake drum for retaining the rim stopper. The arrangement further comprises a plurality of spacers, each being disposed between the brake drum and each wheel clamp.

3 Claims, 3 Drawing Figures

TIRE RIM AND BRAKE DRUM ARRANGEMENT

BACKGROUND OF THE INVENTION

1. Field of the Invention:

This invention relates to a braking system, and more particularly to an improvement of a brake drum arrangement of a wheel of a vehicle wherein a wheel brake is disposed outside a tire.

2. Description of the Prior Art:

In the prior art brake drum arrangement of this kind, a plurality of wheel clamps for clamping a tire's rim stopper are fixedly secured to the outer side face of a wheel hub in the vicinity of the outer peripheral surface thereof. For this reason, a space enough for tightening clamp nuts to secure the wheel clamps is required to be provided between the inner peripheral surface of the tire rim and the outer peripheral surface of the brake drum. Therefore, the size or outer diameter of the brake drum is unavoidably restricted. This means that the space surround by the tire rim cannot be fully utilized for the brake drum, so that the braking capacity thereof cannot be further increased and there are inconveniences in case of performing maintenance and inspection of such prior art arrangement.

SUMMARY OF THE INVENTION

The present invention aims to eliminate the above-mentioned disadvantages in the prior art arrangement, and has for its object to provide a brake drum arrangement wherein the space surrounded by the tire rim can be fully utilized for the brake drum itself so that the inspection and maintenance thereof can be easily effected.

In accordance with one aspect of the present invention, there is provided a brake drum arrangement for use in a braking system including a brake drum with the inner end face fixedly secured to the outer end face of a wheel hub, an annular rim stopper and a plurality of wheel clamps for tightening the rim stopper wherein the wheel brake is disposed outside a tire, the improvement characterized in that the outer peripheral surface of the brake drum is flush with that of the wheel hub, that the annular rim stopper is adapted to be mounted on the outer peripheral surface of the brake drum, and that the wheel clamps adapted to be fixedly secured to the outer side face of the brake drum, whereby the space surrounded by the tire rim can be fully utilized for the brake drum itself so as to enable the braking capacity thereof to be increased and the inspection and maintenance thereof to be easily carried out.

In accordance with another aspect of the present invention, the brake drum arrangement is further provided with a plurality of spacers, each adapted to be interposed between the brake drum and each of the wheel clamps.

BRIEF DESCRIPTION OF THE DRAWINGS

The above and other objects, features and advantages of the present invention will now be apparent from the following description taken in conjunction with the accompanying drawings in which.

DETAILED DESCRIPTION OF THE PREFERRED EMBODIMENT

Figure 1:
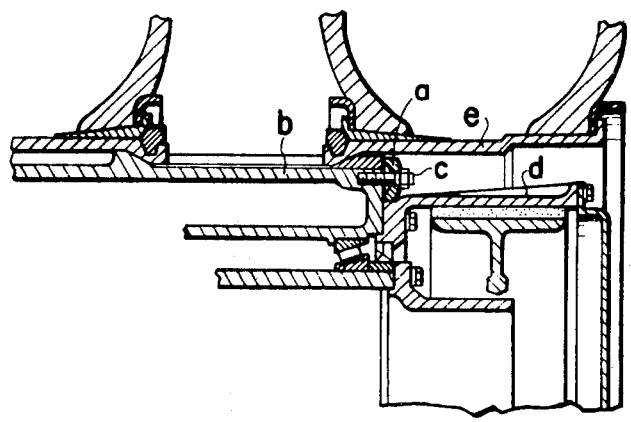
FIG. 1 is a fragmentary vertical sectional view of a conventional brake drum arrangement.

For better understanding of the present invention, a prior art brake drum arrangement will now be explained hereinbelow with reference to FIG. 1, in which wheel clamps "a" are shown as being mounted on the outer side face of the wheel hub "b" in the vicinity of the outer peripheral surface thereof. In such an arrangement, a space enough for screwing or loosening clamp nuts "c" to secure or remove wheel clamps "a" for tightening an annular rim stopper "f" in position is left between the inner peripheral surface of a tire rim "e" and the outer peripheral surface of a brake drum "d". Therefore, the outer diameter of the brake drum is unavoidably reduced by the diameterical dimension of the space resulting in corresponding decrease in the inner diameter of the drum "d". As a consequence, braking capacity of the brake drum "d" cannot be further increased, in addition, there are inconveniences in case of performing inspection and maintenance of such arrangement.

Figure 2:
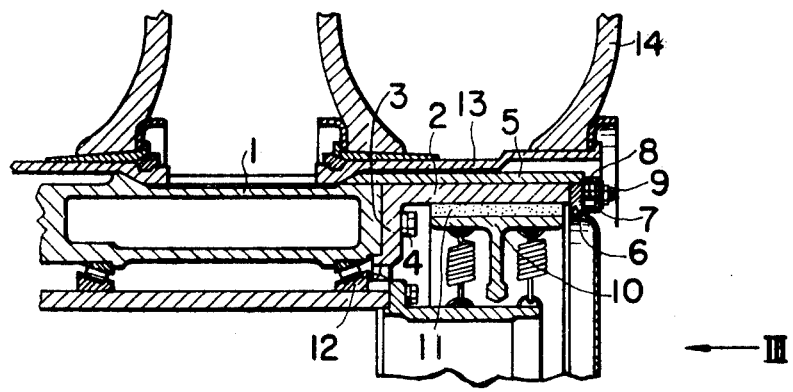
FIG. 2 is a fragmentary vertical sectional view of a brake drum arrangement according to one embodiment of the present invention.
Figure 3:
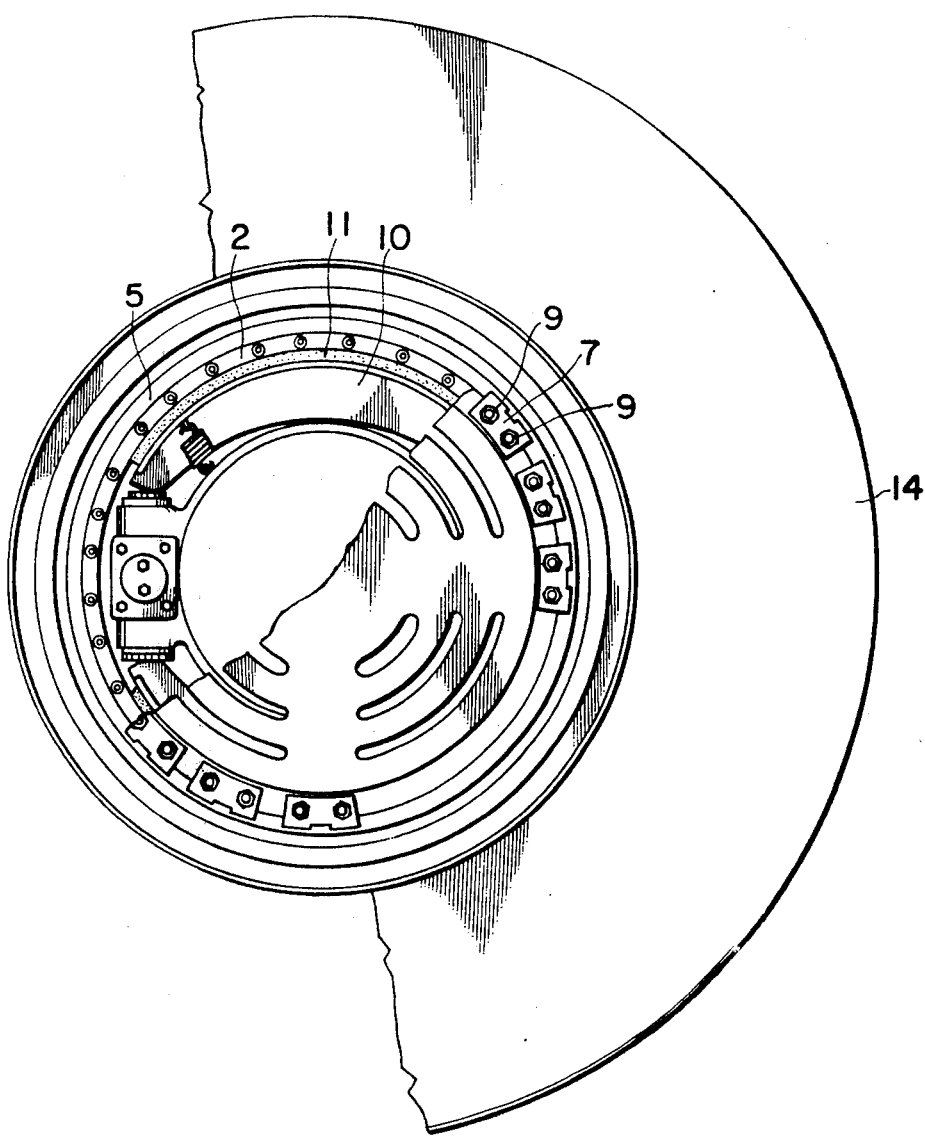
FIG. 3 is a side view of the arrangement shown in FIG. 2 viewed in the direction of the arrow III.

The present invention will now be described in detail hereinbelow with reference to FIGS. 2 and 3.

Reference numeral 1 represents a wheel hub. Secured to the end face of the wheel hub 1 by means of bolts 4 is a rib portion 3 formed in the inner end portion of a brake drum 2. Fitted on the outer peripheral surface of the brake drum 2 is a rim stopper 5. Further, spacers 6 and wheel clamps 7 are fixedly secured to the outer end face of the brake drum 2 by means of bolts 8. As can be seen from the drawing, the arrangement is made such that when clamp nuts 9 for the bolts 8 are tightened the wheel clamps 7 urges against the rim stopper 5. Further, reference numeral 10 denotes a brake shoe, 11 a brake lining, 12 a wheel bearing, 13 a tire rim, and 14 a tire.

As is obvious from the above description, according to the brake drum arrangement of the present invention, the 'space' surrounded by the tire rim can be fully utilized only for the brake drum itself, so that the inside diameter of the brake drum can be increased up to or within the diametrical dimension of the space. Therefore, braking capacity of the brake drum can be remarkably increased as compared with that of the prior art brake drum, and also the inspection and maintenance of the drum arrangement of the invention can be more readily carried out.

What is claimed is:

1. In a brake drum arrangement in a wheel of a vehicle, including a brake drum with an inner end face fixedly secured to an outer end face of a wheel hub, an annular rim stopper removably interposed between a tire rim on which a tire of the wheel is mounted and the wheel hub, for retaining the tire rim on the wheel hub, a plurality of wheel clamps for holding said rim stopper in position and a wheel brake positioned within said brake drum, the improvement wherein the outer peripheral surface of the brake drum is aligned with the outer periphery of the wheel hub and said annular rim stopper is mounted around and extending over the entire outer peripheral surface of the brake drum and is held in position by the wheel clamps fixedly secured to an outer end face of the brake drum thereby increasing the diameter of said brake drum to the maximum within a space surrounded by said tire rim so as to enhance the braking efficiency and improving the facility of assembly or disassembly of said arrangement.

2. The arrangement as set forth in claim 1, further comprising a plurality of spacers interposed between the outer end face of the brake drum and each of the wheel clamps.

3. The arrangement as set forth in claim 2, further comprising bolt means for fixedly securing a rib portion formed in the inner end portion of said brake drum to said outer end face of said wheel hub.

* * * * *